P. B. DELANY.
METHOD OF AND APPARATUS FOR DETECTING THE PRESENCE AND LOCATION OF SUBMERGED METALLIC BODIES.
APPLICATION FILED APR. 30, 1915.
1,209,680.
Patented Dec. 26, 1916.
2 SHEETS—SHEET 1.
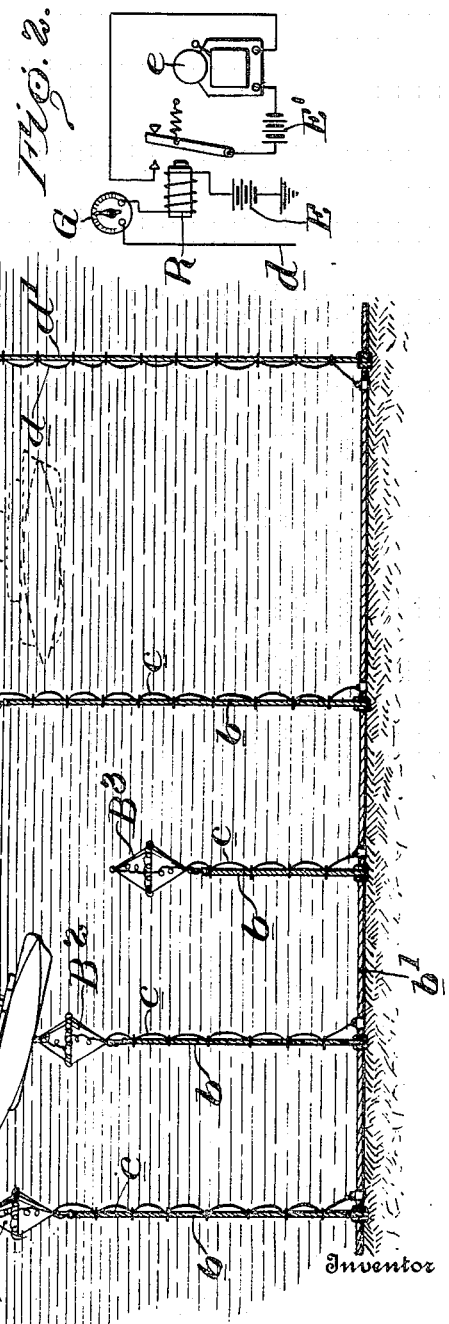

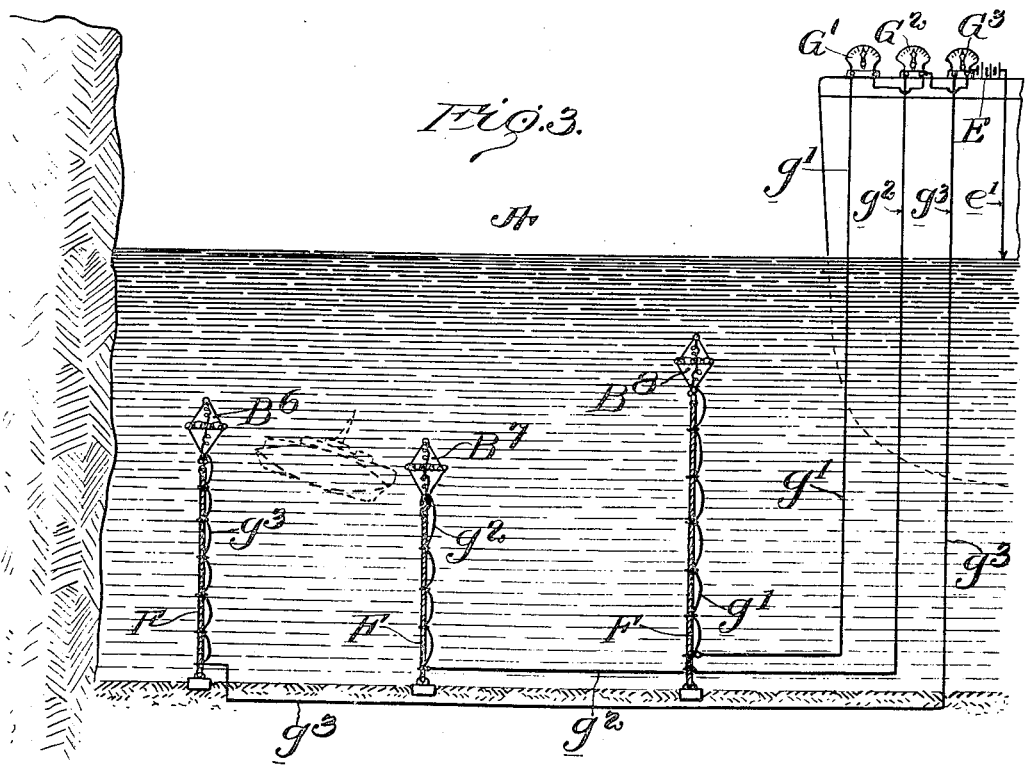

UNITED STATES PATENT OFFICE.

PATRICK B. DELANY, OF SOUTH ORANGE, NEW JERSEY.

METHOD OF AND APPARATUS FOR DETECTING THE PRESENCE AND LOCATION OF SUBMERGED METALLIC BODIES.

1,209,680.

Specification of Letters Patent.

Patented Dec. 26, 1916.

Application filed April 30, 1915. Serial No. 24,978.

*To all whom it may concern:*

Be it known that I, PATRICK B. DELANY, a citizen of the United States, residing at South Orange, in the county of Essex and State of New Jersey, have invented certain new and useful Improvements in Methods of and Apparatus for Detecting the Presence and Location of Submerged Metallic Bodies, of which the following is a specification.

The object of this invention is to provide a simple and efficient way of detecting the presence in a body of water or the location therein of submerged metallic bodies or bodies partly metallic, such as submarines, floating mines, etc.

In carrying out my invention I make use of the fact that the presence of a contiguous conductor or body of conducting material near or in contact with the exposed electrode of a closed electric circuit of high resistance in a body of water forming part of the circuit reduces the resistance between such electrode and the ground and if such an electrode be connected with a suitable indicating apparatus or such apparatus be included in the circuit, the presence of the metallic body, which is of many times the area of the electrode or contact, will be determined or indicated by the consequent changes in the character of the current traversing the circuit due to such changes in resistance.

The accompanying drawings, which are merely diagrammatic, show some of the ways of embodying my invention.

Figure 1 shows diagrammatically how metallic buoys or buoys bearing metallic contacts or electrodes may be anchored or supported at the mouth of a harbor and connected electrically with a detector or indicating apparatus on a ship in or near the harbor. Fig. 2 is a diagram of the circuits of the detector or indicating apparatus shown in Fig. 1. Fig. 3 is a view similar to Fig. 1, showing how a number of buoys may be connected with a series of detectors or indicating devices.

Fig. 1 shows the mouth of a harbor A between headlands A', A', equipped with a number of buoys B', $B^2$, $B^3$, $B^4$. These buoys may have exposed metallic surfaces or may be provided with a number of metallic contact points or knobs. They are held in place by vertical cables $b$ made fast to a horizontal cable $b'$ below them, and they are connected by insulated wires $c$ to a conductor in or supported by the cable $b'$ and which connects with a conductor $d$ carried by a vertical cable $d'$ made fast to the cable $b'$ and holding in place a buoy D located near the ship or other place where the detector is installed. As shown, the conductor $d$ extends to an indicating instrument, such as a galvanometer G and thence the circuit extends to a relay R, thence to a battery E, and then to the water, *i. e.*, to ground. The relay controls a local circuit including a battery E' and a bell $e$. The adjustments are so made that ordinarily the galvanometer shows no current or a very feeble current owing to the great resistance produced by the water included in the ground circuit, but should a submarine, floating mine or other object composed largely of metal come in close proximity to the buoys the resistance in the circuit will be greatly reduced and this will be manifest in the galvanometer, thus indicating danger or the necessity for vigilance. I may also employ, in connection with the galvanometer or similar instrument, an audible or other alarm such as the bell $e$ in a local circuit, or I may employ any suitable detector or indicator for this purpose. It is obvious that the nearer the vessel, mine or the like approaches a buoy the greater will be the reduction in resistance and when such an object comes in close contact with a buoy or a contact thereon the maximum current will be shown on the indicating instrument. In this way a harbor or other portion of a body of water may be effectively protected.

Instead of connecting all the buoys to a single indicating or detecting instrument, I may employ a series of circuits connected with a plurality of instruments, as shown in Fig. 3, where a series of buoys $B^6$, $B^7$, $B^8$ similar to those shown in Fig. 1, are separately connected by conductors $g'$ $g^2$, $g^3$ to a series of galvanometers or indicating instruments G', $G^2$, $G^3$ and all these circuits are connected with a battery E, in turn connected to the water, *i. e.*, to ground, as indicated at $e'$. The buoys are held in place by vertical cables F, suitably anchored as shown. By such an organization not only can the presence but also the approximate location of submarines or other objects brought into proximity to one of the buoys may be determined, and it is also possible by such an organization to determine the direction in which the object is moving. It is of course understood that the number of buoys used and their relative positions will be determined by particular conditions and circumstances, and it is obvious that the indicating instruments may be located on ship or on land.

I have given some concrete examples in a diagrammatic way of how my invention may be practically used but it should be understood that an illustration or description of details of construction has not been attempted as these will greatly vary in different circumstances. The general underlying principle of the invention has been fully explained, and as before stated is based on the fact that a closed circuit of high resistance, such as a circuit including a body of water will have its resistance decreased by the approach of a metallic body or the entrance thereof into the circuit and this change in the circuit conditions may be made manifest in suitable instruments included in the circuit.

I claim as my invention:—

1. The herein described method of determining the presence of a metallic body in the vicinity of a plurality of stationary electrodes in and connected by water forming closed circuits of high resistance, which consists in varying the resistance of one or more of said closed circuits by the contact of said body with one or more of said electrodes, and producing an indication of said variation.

2. The herein described method of detecting the presence or location of a submerged object of conducting material such as a submarine vessel in proximity to a plurality of electrodes in and connected by water forming a plurality of closed circuits of high resistance, which consists in varying the resistance of one of said circuits by the contact of such object with one of said electrodes, and producing an indication of such variation.

3. An apparatus for detecting the presence of metallic objects, comprising a series of submerged electrodes disposed in different vertical planes, indicating devices respectively connected with said electrodes by a series of metallic conductors of low resistance, and connections between said electrodes and said indicating devices comprising the body of water in which the electrodes are disposed.

4. A device for indicating the presence of submarine vessels, comprising a submerged floating electrode, a remote indicating station, means constituting a circuit of low resistance connecting said electrode to said indicating station, and a circuit of high resistance between said electrode and said indicating station, comprising the body of water in which the electrode is disposed, said indicating station operated by the inclusion in said last named circuit of a submarine vessel whereby the resistance of said circuit is decreased.

5. An apparatus for detecting the presence of metallic objects, comprising a plurality of submerged electrodes disposed in different zone areas, an indicating station, a plurality of low resistance circuits leading to said indicating station, and a plurality of high resistance circuits including said electrodes, said indicating station being operated by the inclusion in one or more of said last named circuits of said metallic object.

6. An apparatus for detecting the presence of metallic objects, comprising a plurality of submerged electrodes disposed in different zone areas, an indicating station, a plurality of indicating devices at said station, a plurality of low resistance circuits respectively connecting one of said electrodes with one of said indicating devices, and a plurality of high resistance circuits including said electrodes, said indicating devices being operated by the inclusion in one or more of said last named circuits of said metallic object.

In testimony whereof, I have hereunto subscribed my name.

PATRICK B. DELANY.

Witnesses:
MARY W. WALLACE,
L. F. BROWNING.